United States Patent
Brown et al.

(10) Patent No.: US 6,560,325 B2
(45) Date of Patent: *May 6, 2003

(54) TELECOMMUNICATION RESOURCE ALLOCATION SYSTEM AND METHOD

(75) Inventors: Barry D. Brown, Mesquite, TX (US); John S. Hogg, Hurst, TX (US)

(73) Assignee: T-Netix, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/115,488

(22) Filed: Apr. 2, 2002

(65) Prior Publication Data

US 2002/0106068 A1 Aug. 8, 2002

Related U.S. Application Data

(63) Continuation of application No. 09/072,436, filed on May 4, 1998, now Pat. No. 6,381,321.
(51) Int. Cl.[7] .............................. G06F 9/00; H04M 3/42
(52) U.S. Cl. ............ 379/207.02; 370/259; 379/201.05; 379/201.12; 709/104
(58) Field of Search ..................... 370/259; 379/201.01, 379/201.05, 201.12, 207.02, 220.01; 709/104

(56) References Cited

U.S. PATENT DOCUMENTS 6,381,321 B1 * 4/2002 Brown et al. .......... 379/207.02

* cited by examiner

*Primary Examiner*—Harry S. Hong
(74) *Attorney, Agent, or Firm*—Fenwick & West LLP

(57) ABSTRACT

A telecommunication system includes a plurality of applications, a plurality of telecommunication resources, and a telecommunication services kernel. At least one telecommunication resource is capable of generating an event and each application is capable of responding to an event. The telecommunication services kernel couples a requested application triggered by the event with telecommunication resource required by the application. The telecommunication service kernel also de-couples the requested application and the required telecommunication resource in response to the requested application completing execution. The required telecommunication resource is now available to other applications. A method for allocating a telecommunication resource to an application in a telecommunications system is also disclosed.

25 Claims, 12 Drawing Sheets

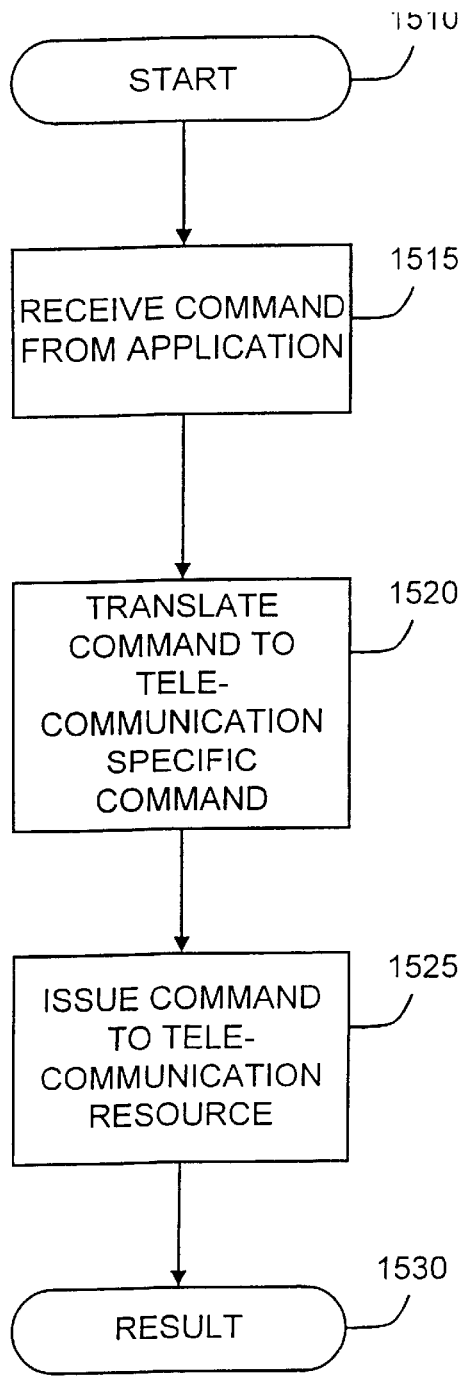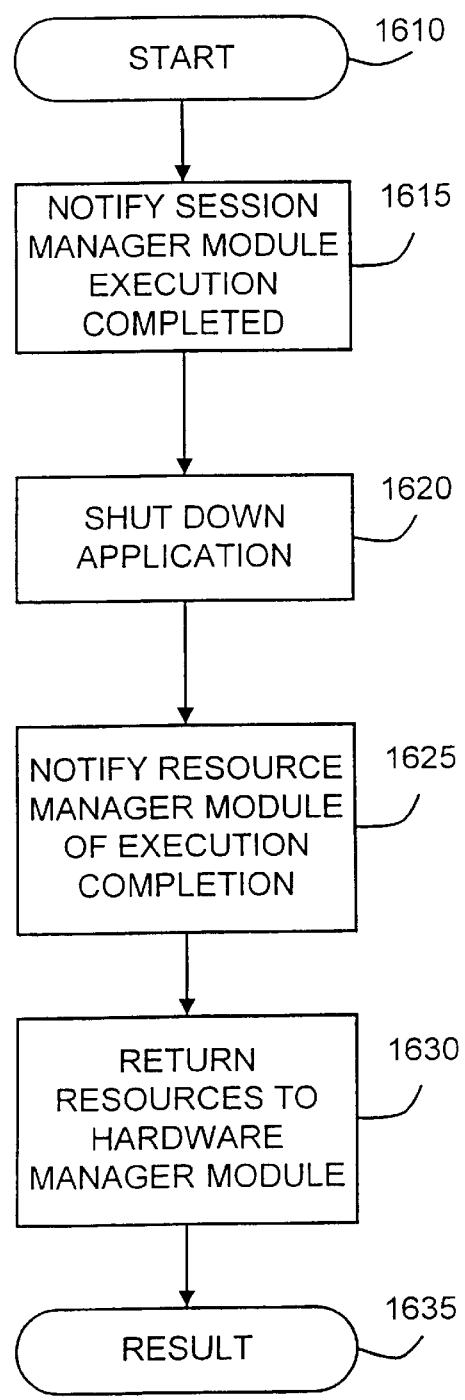
*FIG. 15*  *FIG. 16*

TELECOMMUNICATION RESOURCE ALLOCATION SYSTEM AND METHOD

CROSS REFERENCE TO RELATED APPLICATIONS

This application is a continuation of U.S. patent application Ser. No. 09/072,436, filed on May 4, 1998, now U.S. Pat. No. 6,381,321, the contents of which are herein incorporated by reference.

BACKGROUND OF THE INVENTION

1. Field of the Invention

This invention relates to the field of telecommunications systems, and more particularly, to systems and methods for allocating telecommunication resources to an application in a telecommunications system.

2. Description of the Related Art

Conventional computer telephony products allow for connecting applications to particular computer telephony resources, or components. To connect these components within a computer telephony product, the application must be written to use each manufacturers programming interface for the application to be able to communicate with the telephony resources. For each telephony resource within a computer telephony product, it is necessary to write a portion of the application that is dedicated to issuing instructions to that particular type of telephony resource.

In conventional computer telephony products, each application includes a design phase, coding phase, testing phase, and integration phase. Specifically, each portion of the application must be designed to integrate with a specific functionality of each dedicated computer telephony resource and the overall product. This functionality is specifically coded, or written, using computer language code. Each coded portion of the application is then tested to ensure that it functions exactly as designed. Finally, each portion of the application must be integrated to create the final product.

In creating such conventional computer telephony products, multiple development paths are followed during the development cycle. Further, the complexity of conventional computer telephony products requires a large number of paths and a large number of operations along each path. Specifically, these paths must be followed for each portion of the overall system, such as an interface to a particular computer telephony resource or a particular user interface. Moreover, in every instance that a computer telephony resource is changed or added, the appropriate development paths must also be changed or added. This is particularly troublesome when the computer telephony resource involves different types of hardware.

To help ease development, a first generation of software based computer telephony products used Computer Aided Software Engineering (CASE) tools to design systems. These conventional CASE development systems make it easier to determine how many paths or what changes are needed on a given path to build or reconfigure a computer telephony product. These conventional systems, however, do not reduce complexity because they can not, for example, reduce the number of paths needed to complete changes in a conventional computer telephony product.

A second generation of software based computer telephony products used Code Generators (CG) to design systems. The CG development systems automated the process for developing paths to completion. This makes the actual time spent following the paths to completion more reasonable. Conventional CG developed or derived systems, however, have numerous drawbacks. For example, similar to the conventional CASE developed systems the CG developed systems cannot reduce the number of paths necessary to be followed for completion.

Moreover, any additional computer code input beyond that generated by the CG program is lost and must to be re-done for each change in the path to completion. These changes, of course, are tedious and laborious and the process is prone to introducing new or additional errors into the computer telephony product.

To further help ease the development process, a third generation of computer telephony products developed through the vendor companies that produce the computer telephony resources. Specifically, these vendors developed two divergent design schemes that provide design specifications that computer telephony resource manufactures might follow. If followed, the specifications allow for computer telephony resources from different vendors to operate within the same computer telephony product.

The first of the two design schemes developed is Multi-Vendor Interface Protocol ("MVIP") and the second design scheme is SCBus. It is noted that the original design scheme was called SCSA for Signal Computing System Architecture, later this was modified to SCBus, which is Signal Computing Bus, and it has now been extended for multi-chassis integration and is call SCxBus for Signal Computing extended Bus.

Although these design schemes allow for having multi-vendor computer telephony resources within a single conventional computer telephony product, there are still drawbacks to this generation of computer telephony products. Foremost among the problems is that these standards only apply to the communications between telephony resources and make no changes in the application to telephony resource communication. That is, with the MVIP or SCBus protocol, it is possible to put different vendor's hardware into the same product, but the application must still be written to each individual telephony resource within the product.

In an attempt to address the shortcomings of the previous three generations, a fourth generation of computer telephony products was developed. These conventional computer telephony products were developed using the MVIP and SCBus design schemes and layered on a new application protocol that allowed multiple applications to run on a given set of computer telephony resources.

These conventional computer telephony products do allow for allocating multiple computer telephony resources among multiple applications, but only in a static manner. That is, resource allocation in these products is fixed during an initialization of the product by using a configuration file provided by a product administrator and this configuration file cannot be changed without re-starting or re-initializing the product which, of course, requires all applications to be shut down.

This fourth generation of computer telephony products still has a number of drawbacks. For example, the computer telephony resources must be allocated to an application before any application goes into operation. Further, these products lack flexibility, such as dynamic configuration, because all resources must be allocated at initialization to particular applications. Moreover, these products lack dynamic scalability because the addition or subtraction of new computer telephony resources requires re-start and re-initializing of the computer telephony product.

Therefore, there is a need for a telecommunication system and method that (1) allows for dynamic configurability of telecommunication resources that (2) does not require applications to be dedicated to particular telecommunication resources at development or system initialization, while (3) providing system flexibility and scalability by allowing for addition or subtraction of telecommunication resources without re-initializing the telecommunication services system and (4) provides fewer and shorter paths to completion for applications.

SUMMARY OF THE INVENTION

The present invention includes a telecommunication (including computer telephony) system and a method for dynamically allocating one or more telecommunication resources to a requesting telecommunications application within a telecommunications product. The present invention includes computer hardware components; for example, a central processing unit, a memory, and a storage device that are coupled through a data bus line. The present invention may also include other computer hardware components; for example, a video card, a serial port, a device controller, and a network card.

In one embodiment, the telecommunication system or product also a plurality of telecommunication resources and a telecommunication services kernel. The telecommunication system works with one or more applications that provide telecommunication functions. Each application is capable of responding to an event generated within the telecommunication system. Further, at least one telecommunication resource is capable of generating an event for a requested application. This event may include executing (processing) a requested application.

The telecommunication services kernel couples the requested application with a required telecommunication resource or resources for that application. When the application completes execution and finishes use of the telecommunication resource or resources, the telecommunication services kernel de-couples the required telecommunication resource or resources from the requested application and makes it available for another instance of that application or another application within the system.

In one embodiment, the telecommunication services kernel includes a system manager module, a session manager module, a hardware manager module, a resource manager module, and a connection manager module. The modules are coupled through a core services module interface to a core services module. The core services module passes messages between an operating system that interfaces with the hardware components of the telecommunication system, and the modules of the telecommunication services kernel.

The system manager module provides an inventory of the plurality of logical telecommunication resources in the telecommunication system. In addition, the system manager starts applications as requested in response to the event. The session manager module is coupled to the system manager and registers each application that is started and currently executing in the telecommunication system.

The hardware manager module initially configures each physical telecommunication resource and maps physical resources into logical units that is in or added to the telecommunication system. The hardware manager module also tracks each telecommunication resource that is not allocated from the plurality of telecommunication resources. The resource manager is coupled to the hardware manager module. The resource manager module tracks each telecommunication resource that is allocated to and in use by any application.

The connection manager module is coupled to the resource manager module. The connection manager module establishes routing information in the telecommunication system using internal routing tables, internal and external telephony resource mapping, and it's own internal connection map. The routing information includes voice and data paths both internally, as well as externally to, the telecommunication system.

Where possible, the connection manager provides a route from this routing information to a telecommunication resource in response to the telecommunication resource needing a particular voice or data path. The connection manager then notifies the application that the path is either successfully set up or was not successful, in which case each application must determine what further action may be necessary.

The telecommunication system also includes a virtual device interface that is coupled, or may be integrated with, to the telecommunication services kernel. The virtual device interface provides an interface between an application and the telecommunication services kernel. The virtual device interface is a virtual telephony resource having all possible telecommunication resource capabilities. The virtual device interface includes a translation unit, a command receive unit, and a command send unit.

The command receive unit receives a request from the application to perform a particular function. The translation unit translates this virtual device command from the application to the specific hardware-related commands that can be understood by the vendor- or standards-specific telecommunication resources in the telecommunication system. The command send unit issues the specific commands to the specific telecommunication resource. The components and process also function vice versa so that a telecommunication resource command is translated for the application.

Thus, applications may be written to this single interface rather than to each specific interface associated with each telecommunication resource. This allows development of systems without prior knowledge or understanding of the capabilities of particular hardware vendors or other telephony resources, thereby reducing and shortening the number of development paths necessary.

The telecommunication system provides a process for dynamically assigning at least one telecommunication resource to the application requesting the telecommunication resources in response to the triggering event signal. Specifically, the event signal is received by the telecommunication services kernel. The telecommunication system starts and executes an application in response to the event signal.

The application then signals a request for a telecommunication resource from the telecommunication services kernel. In response to this request, the telecommunication services kernel determines if a telecommunication resource is available for allocation. If a telecommunication resource is available for allocation it proceeds to allocate that available telecommunication resource to the application. If telecommunication resources are not available, the application is notified and the application provides further responses as to a relevant course of action.

When the application completes execution, it notifies the telecommunication services kernel. The telecommunication services kernel de-allocates the telecommunication resource from the application. The telecommunication resource is now available to be allocated for a future request for a telecommunication resource by an application.

The telecommunication system and method of the present invention advantageously allows for allocating a telecommunication resource to an application in a dynamic manner. By keeping a single pool or multiple administrator defined pools of telecommunication resources, rather than dedicating each particular telecommunication resources to particular applications, the present invention beneficially increases overall system utilization and efficiency. Moreover, the present invention decreases system costs because more applications can be introduced into the system without having to arrange for additional dedicated telecommunication resources.

In addition, the present invention allows for telecommunication resources to be dynamically added or subtracted from the telecommunication system without having to re-start and re-initialize because the telecommunication services kernel manages the telecommunication resources and the applications are not dedicated to any particular telecommunication resource. Further, application developments costs are also reduced because applications can be written to a single, standardized virtual device interface so that concerns of writing to specific or particular vendor or manufacturer defined telecommunication resource specifications are eliminated.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 15 is a flow diagram illustrating one embodiment of a process for communication between an application and an allocated telecommunication resource through a virtual device interface in accordance with the present invention; and FIG. 16 is a flow diagram illustrating one embodiment of a process for de-coupling and returning an assigned telecommunication resource from an application back to a pool of telecommunication resources in a telecommunication system in accordance with the present invention.

DETAILED DESCRIPTION OF THE PREFERRED EMBODIMENTS

The present invention includes a telecommunication (including computer telephony) system and a method for dynamically allocating one or more telecommunication resources to a requesting telecommunication application.

Figure 1:
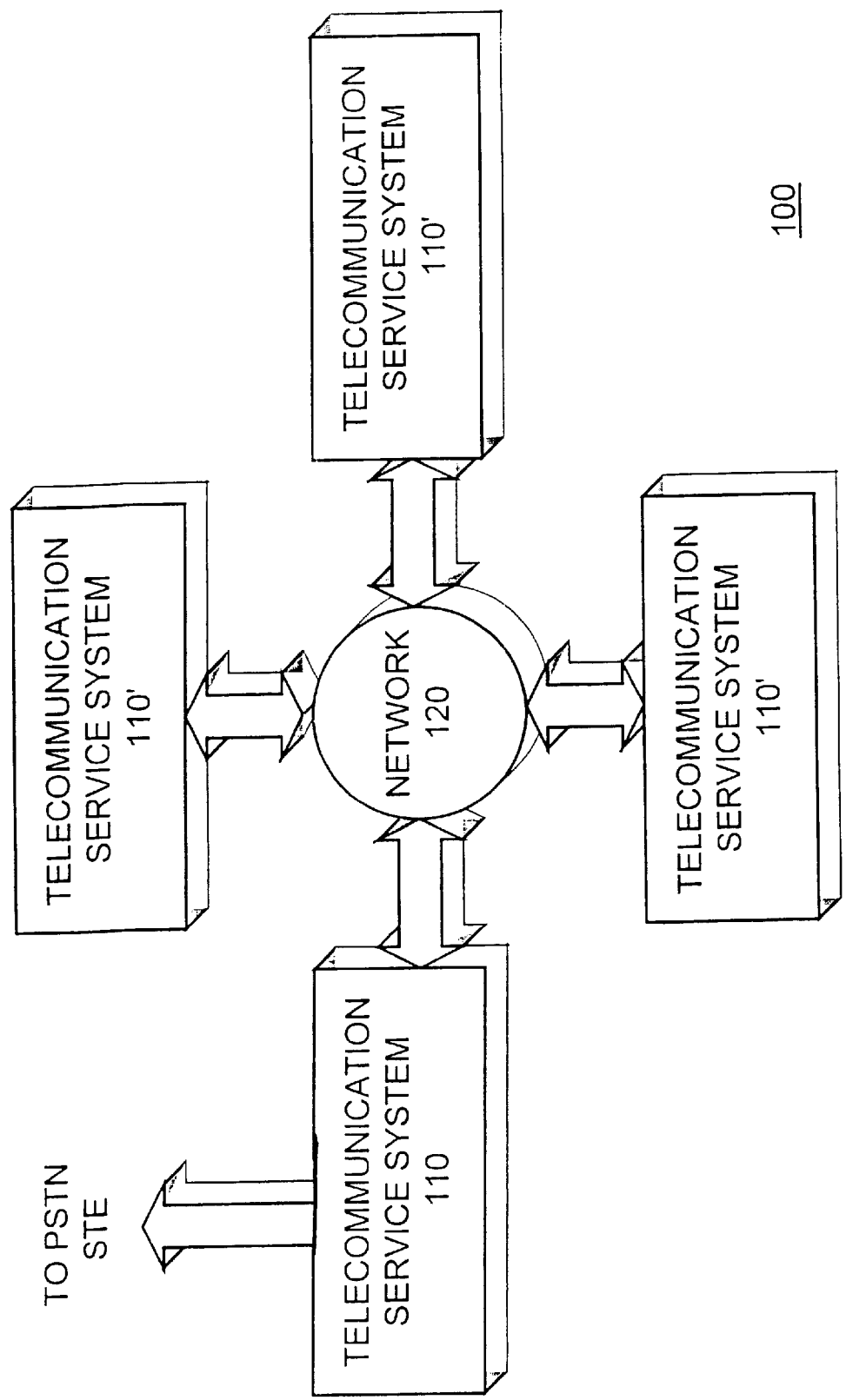
FIG. 1 is a block diagram illustrating one embodiment of a telecommunication system in accordance with the present invention.

FIG. 1 is a block diagram illustrating one embodiment of a telecommunication system 100 in accordance with the present invention. The telecommunication system 100 includes a primary telecommunication service system 110. The telecommunication system 100 may also include one or more additional telecommunication service systems 110' and a network 120.

The primary telecommunication service system 110 and the additional telecommunication service systems 110' are coupled as nodes on the network 120. The network 120 can be any data passing network, for example, local area network, wide area network, telecommunication network, or computer system data bus. Further, a connection to a public switched telephone network ("PSTN") can be made from any node (i.e., the primary node 110 or any of the additional nodes 110') within the system.

Figure 2A:
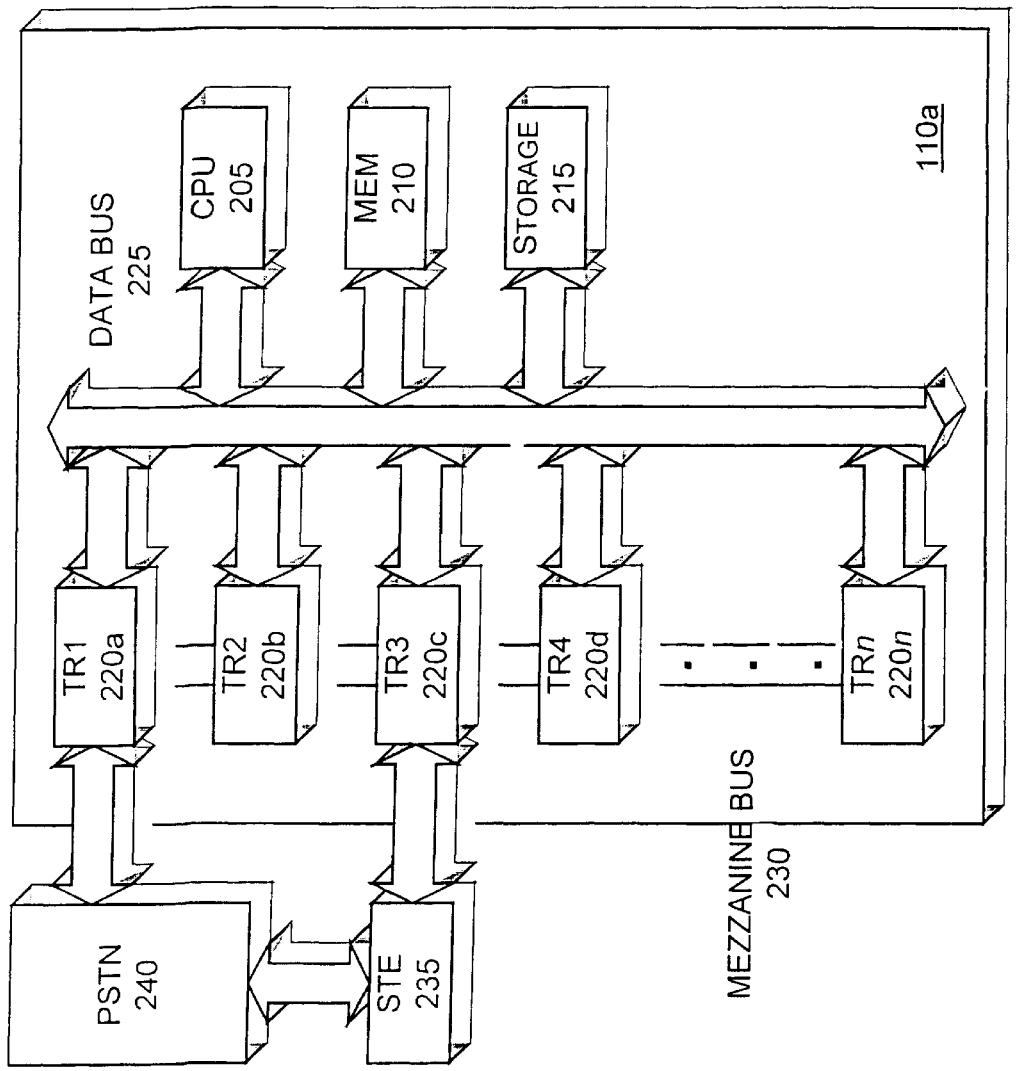
FIG. 2a is a block diagram illustrating one embodiment of a telecommunication service system in accordance with the present invention.

FIG. 2a is a block diagram illustrating a second embodiment of the telecommunication service system 110a in accordance with the present invention. The telecommunication service system 110a includes a central processing unit ("CPU") 205, a memory 210, a storage device 215, one or more telecommunication (including computer telephony) resources 220a–220n (generally 220), a data bus 225, and a mezzanine bus 230. The central processing unit 205, the memory 210, the storage device 215, and each of the telecommunication resources 220a–220n are coupled through the data bus 225. Further, each of the telecommunication resources 220a–220n are coupled to each other through the mezzanine bus 230.

The telecommunication service system 110a is coupled to one or more standard telecommunication equipment devices or systems ("STE") 235. Specifically, each STE device 235 may be coupled to a telecommunication resource, e.g., 220c. The STE device 235 is coupled to a public switched telephone network ("PSTN") 240.

The central processing unit 205 may be a conventional processor or processing device or system, for example, a x86 or Pentium™ processor by Intel Corporation of Santa Clara, Calif., a SPARC processor by Sun Microsystems, Inc. or Palo Alto, Calif., a PowerPC processor by Motorola, Inc. of Schaumburg, Ill., or other processing device or system that processes computer instructions. The memory 210 may be a conventional memory device or system, for example, a dynamic random access memory, a static random access memory, or other memory device or system that stores dates, instruction, or the like. It is noted that the memory 210 may extend to include the storage device 215.

The storage device 215 may be a conventional mass storage device or system, for example, a hard disk, a CD-ROM, a write-able CD-ROM, a flash memory, tape drive, a compression storage drive, or other storage device or system that allows for longer term storage of data, instructions, or the like. The data bus 225 may be a conventional data bus, for example, an Industry Standard Architecture ("ISA") data bus, a Peripheral Component Interface ("PCI") data bus, or other data bus capable of transferring data, instructions, and the like.

The telecommunication resource ("TR") 220 may be a conventional or custom line card that interfaces with the PSTN 240 or the STE 235, for example, a Rhetorex ASI Station Interface Card from Lucent Technologies Inc., of Murray Hill, N.J., a Natural MicroSystems Station Interface Card from Natural MicroSystems, Inc., of Framingham, Mass., or other interface card that is cable of interfacing with the PSTN 240 or the STE 235. Moreover, the telecommunication resource 220 can be integrated with the PSTN 240 or the STE 235. The mezzanine bus 230 may be a conventional mezzanine bus, for example, a Multi-Vendor Interface Protocol ("MVIP") bus, the Signal Computing System Architecture SCBus ("SCBus") or Signal Computing extended bus ("SCxBus"), or the like.

The STE 235 device or system may be a conventional STE device or system, for example, a public branch exchange ("PBX"), a standard telephone, a pay telephone, a cellular telephone, an answering system, a playback system, a facsimile system, a voice mail system, or other STE device or system capable of providing voice, media, or data telecommunication functions. The PSTN 240 is a conventional public switched telephone network, including wireless communication networks, for example, those owned and operated by SBC Communications Inc. of San Antonio, Tex. or Cellular One Group of Dallas, Tex., or other public switched telephone network that allows for telephone communications.

Figure 2B:
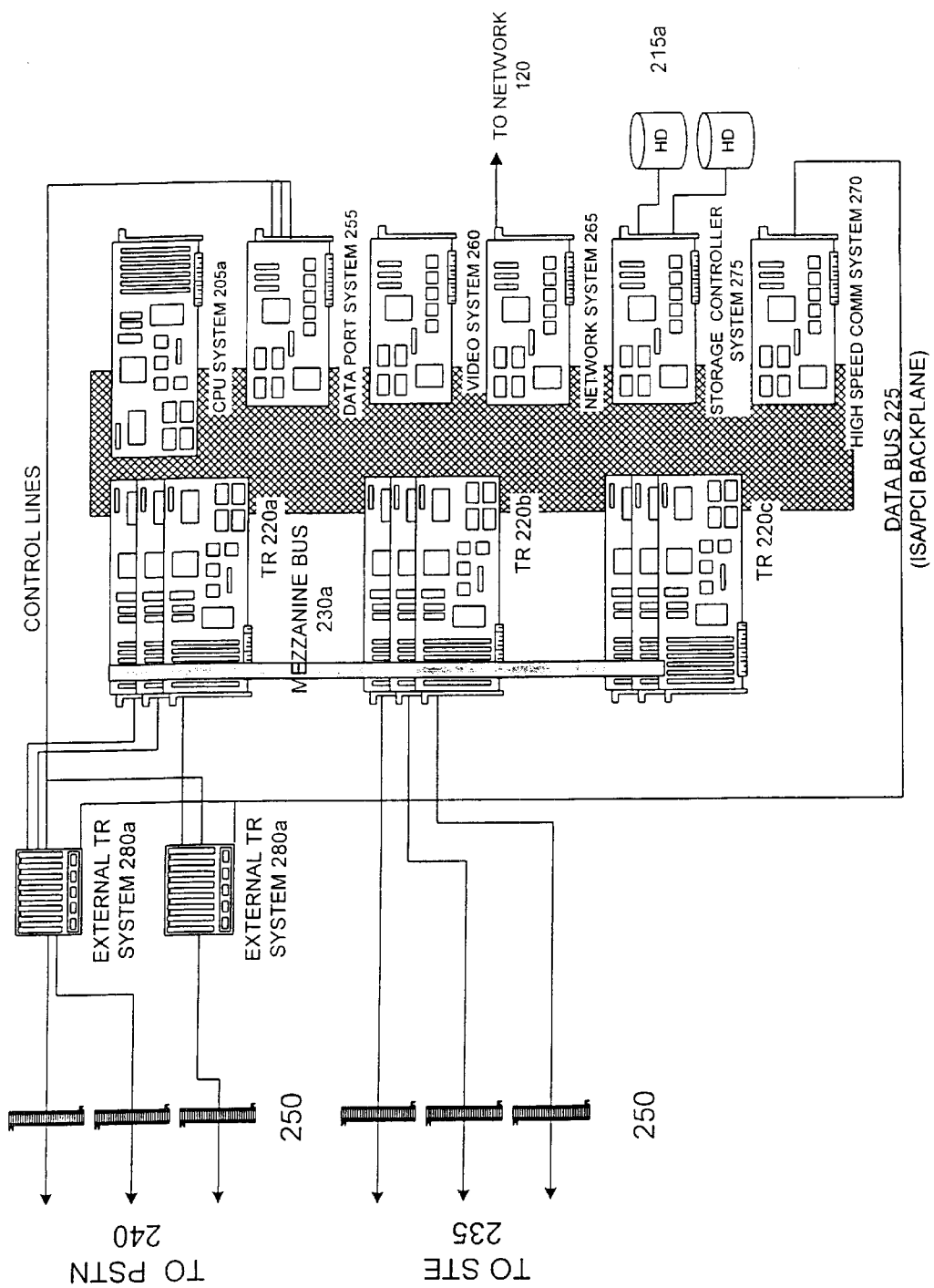
FIG. 2b is a block diagram illustrating another embodiment of a telecommunication service system in accordance with the present invention.

FIG. 2b is a block diagram illustrating a third embodiment of a telecommunication service system 110b in accordance with the present invention. The telecommunication service system 110b includes a central processing unit system 205a, a data port system 255, a video system 260, a network system 265, a storage controller system 275, a hard disk 215a, a high speed communication system 270, a data bus 225a, one or more sets (pools or banks) of telecommunication resources (ports) 220a–220b, a mezzanine bus 230a, and one or more telecommunication blocks 250. The telecommunication blocks 250 coupled the PSTN 240 or the STE 235 with the telecommunication system 100. In addition, the telecommunication service system 110b may optionally include one or more external telecommunication resource systems 280a–280b (generally 280).

The central processing unit system 205a, the data port system 255, the video system 260, the network system 165, the storage controller 275, the high speed communication system 270, and the telecommunication resources 220 are coupled through the data bus 225a, that serves as a backplane. The network system 265 is coupled to the network 120. The storage controller system 275 is coupled to one or more hard disks 215a.

The telecommunication resources 220 are also coupled through the mezzanine bus 230a. In one embodiment, the external telecommunication resource system 280 may be coupled to one or more telecommunication resources 220, the PSTN 240 (through the telecommunication blocks 250), the data port system 255, and the high speed communication system 270. It is noted that the telecommunication resources 220, as well as the external telecommunication resource system 280, may be coupled to the one or both of the PSTN 240 and the STE 235.

It is noted that the CPU system 205a includes the functionality of the central processing unit 205 described above. Further, the CPU system 205a may work in conjunction with other processor systems within the telecommunication service system 110a, for example, those processors associated and functioning with the data port system 255, video system 260, the network system 265, the high speed communication system 170, and the storage controller system 275.

In addition, the hard disk 215a includes the functionality of the storage device or system 215 described above. Also, the data bus 225a includes the functionality of the data bus 225 described above. For example, in the third embodiment of the telecommunication service system 110b, the data bus 225a is an ISA/PCI backplane. Further, the telecommunication resources 220 are similar to the telecommunication resources 220a–220n described above.

In one embodiment, the data port system 255 may be a conventional data port, for example, a serial data port, a parallel data port, or other functionally equivalent data port. The video system 260 may be a conventional video system, for example, a video graphics array ("VGA"), super video graphics array ("SVGA"), extended graphics array ("XGA"), or other video system capable of processing video signals. The network system 265 may be a conventional network system, for example, a token ring network, an Ethernet network, or other network system that provides couples to the network 120.

The high speed communication system 270 may be a conventional high speed communication system, for example, a fiber connection system, a fast Ethernet connection, a T1 or T3 connection, or other high speed communication system. The storage controller system 275 is a conventional storage controller system, for example, a controllers allows for controlling the hard disk 215a or other functionally equivalent controller for controlling the respective storage device 215.

The external telecommunication resource system 280 is an apparatus that provides for a bank of telecommunication resources 220. The external telecommunication resource system 280 allows for the growth and extension of the telecommunication services system 110b. For example, the external telecommunication resource system 280 allows for providing telecommunication resources 220 in locations physically remote from the remainder of the telecommunication service system 110b. Also, for example, the external telecommunication resources system 280 allows for providing additional telecommunication resources 220 through a single telecommunication service system 110b when physical space within that system 110b is already maximized.

To illustrate one example of how the telecommunication service system 110 operates, the following examples follows a process for initiating a long-distance telephone call. For example purposes only, the STE 235 is a telephone and one of the telecommunication resources 220 is a telephony line card to which the telephone is coupled. Also, for this example, one of the other telecommunication resources 220 is a telephony line card connected to the PSTN 240.

When a user seeks to initiate a long distance call, the user will pick up a receiver coupled to the telephone. The telephone triggers a telephone off-hook signal in response to the this action. The telephone off-hook signal is an event signal that is received by the telecommunications resource 220 that is coupled with the telephone. The telecommunication resource 220 signals a system manager module, further described below, via the CPU 205 that the telephone is off-hook.

The system manager module awakens a telecommunication services kernel in the memory 210 to prepare for performing a function. The kernel is further described below. When the user dials the long-distance telephone number, the telecommunication resource informs the kernel in the memory 210 via the CPU 205. The kernel assigns the appropriate telecommunication resource 220 via the CPU 205 so that the telephone can be connected to the PSTN 240 for making the long distance call. A connection manager module, further described below, is then evoked via the CPU 205 to determine the most efficient path for connection between the telephone STE 235 and the PSTN 240 and the path is completed.

Figure 3:
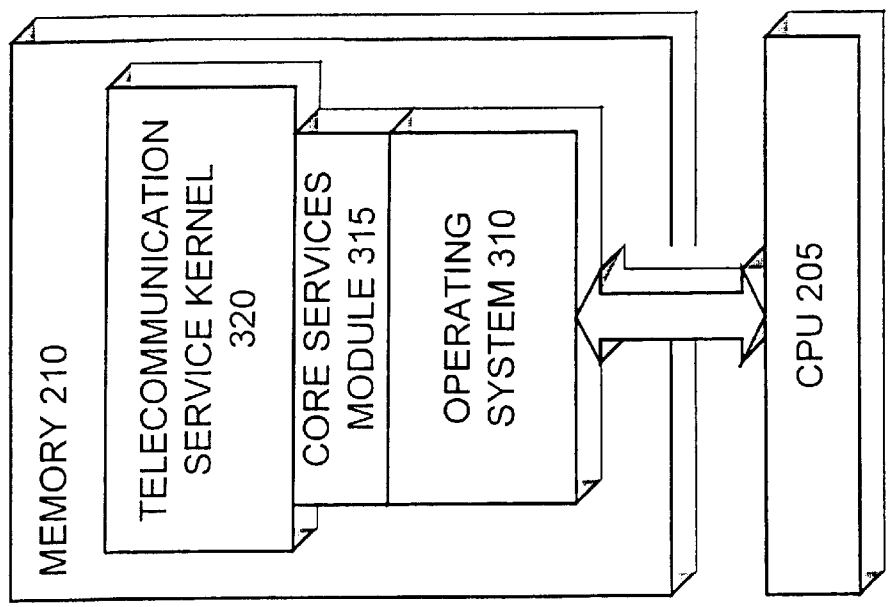
FIG. 3 is a block diagram illustrating one embodiment of a telecommunication sub-system in a memory that interfaces with a central processing unit in accordance with the present invention.

FIG. 3 is a block diagram illustrating one embodiment of a telecommunication service sub-system in the memory 210 that interfaces with the central processing unit 205 in accordance with the present invention. The telecommunication service sub-system includes an operating system 310, a core services module 315, and a telecommunication services kernel 320. The operating system 310 is coupled with the core services module 315 and the central processing unit 205. The core services module 315 is coupled with the telecommunication service kernel 320.

The operating system 310 provides an operating interface, via the central processing unit 205, between the telecommunication service sub-system and the hardware components (e.g., 215, 220, 225, etc.) of the telecommunication service system 110. The operating system 310 may be a multi-tasking operating system that supports intra-process messaging, external or internal to the operating system 310. The operating system may be a conventional computer operating system, for example, QNX OS by QNX Software Systems, Ltd., of Ontario, Canada, OS/2 by IBM Corporation of Armonk, N.Y., Windows 3.x, Windows 95, or Windows 98 by Microsoft Corporation of Redmond, Wash., a UNIX-based operating system, or other computer operating system that is capable of supporting messaging.

The core services module 315 provides a intra-process messaging interface between the telecommunication service kernel 320 and the operating system 310. The core services module 315 includes a messaging interface to which components of the telecommunication service kernel 320 can communicate with each other as well as the operating system. The core services module also provides statistical information, error logging and reporting, and watchdog capabilities.

It is noted that the core services module 315 may be integrated with the operating system 310 or the telecommunication service kernel 320. The telecommunication service kernel 320 manages the telecommunication service system 110. For example, the telecommunication service kernel 320 maintains an inventory of each telecommunication resource 220, manages data and voice paths, and determines telecommunication resource 220 allocation within the telecommunication service system 110. The telecommunication service kernel 320 is further described below.

Figure 4:
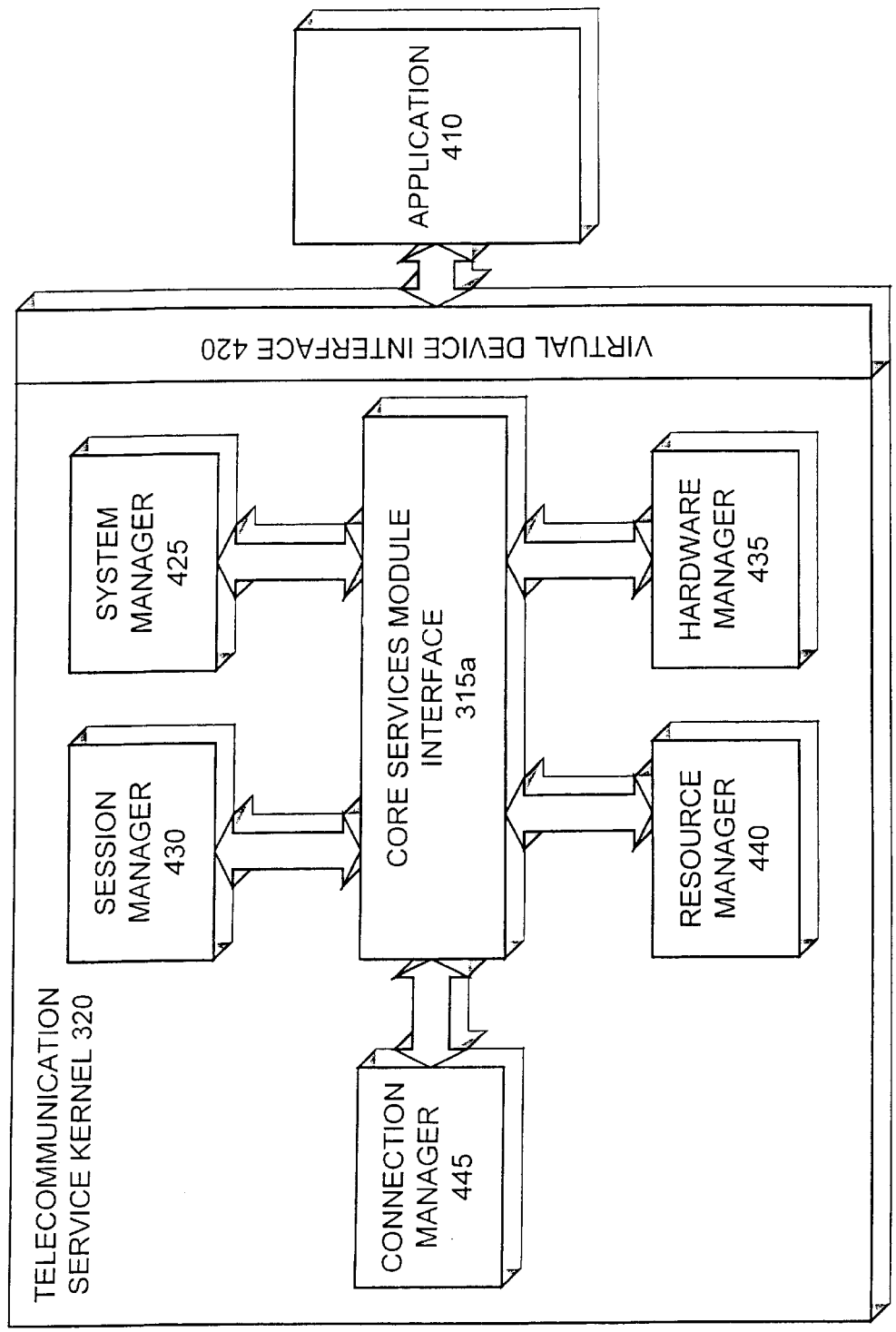
FIG. 4 is a block diagram illustrating one embodiment of a telecommunication service kernel in accordance with the present invention.

FIG. 4 is a block diagram illustrating one embodiment of the telecommunication service kernel 320 in accordance with the present invention. The telecommunication service kernel 320 includes a system manager module 425, a session manager module 430, a hardware manager module 435, a resource manager module 440, and a connection manager module 445. The system manager module 425, the session manager module 430, the hardware manager module 435, the resource manager module 440, and the connection manager module 445 are coupled through the core services module interface 315a.

The telecommunication service kernel 320 is coupled to one or more applications (generally 410) through a virtual device interface 420. Generally, an application 410 in the telecommunication system 100 includes any telecommunication or telephony service for addressing, processing, or operating with calls, media, or data in the telecommunication system 100. The virtual device interface 420 provides a common telecommunication resource interface for an application 410, and is further described below. It is noted that the virtual device interface may be integrated with the telecommunication services kernel 320.

The system manager module 425, the session manager module 430, the hardware manager module 435, the resource manager module 440, and the connection manager module 445 are all resident on, and execute from, the primary telecommunication service system 110. A backup of each of these module 425, 430, 435, 440, 445 may be present on one of the additional telecommunication service system 110', if available, but the backup is not functional unless that module 425, 430, 435, 440, 445 on the primary system 110 fails for any reason.

Generally, the system manager module 425 tracks all of the applications 410 within the telecommunication system 100. The system manager module 425 determines whether an application must be transferred to another application, re-routes, as necessary, and performs load balancing within the telecommunications system.

The session manager module 430 monitors the active sessions of the applications 410 and the other telecommunication service kernel 320 modules 425, 435, 440, 445. Once a session has been started by the system manager module 425, the session manager module 430 is responsible for the session for that application until the application completes execution. At that time the session manager module 430 will inform all the necessary modules that the application has been terminated and will then end that session.

The hardware manager module 435 configures all the hardware resources, e.g., the telecommunication resources 220, within the telecommunication system 100. Configuration includes determining the capabilities of each telecommunication resource 220, assigning logical unit identifiers to each resource 220, and mapping the logical unit identifiers and logical units to physical hardware. The logical unit identifiers are then used by all other portions of the telecommunication system to determine telecommunication resource capabilities and locations. The hardware manager module 435 also supervises all the hardware resources, e.g., the telecommunication resources 220, that are not currently in use by any application 410 in the telecommunication system 100.

The resource manager module 440 maintains ownership information related to the current usage of all telecommunication resources 220 in the telecommunication system 100. The resource manager module 440 handles requests from applications 410 that are requesting or releasing use of a telecommunication resource 220. The resource manager module 440 takes the telecommunication resources 220 from the hardware manager module 435 for use by the application 410 and returns the telecommunication resource 220 to the hardware manager module 435 when the application 410 is done with that telecommunication resource 220.

The connection manager module 445 maps voice and data paths between telecommunication resources using routing tables, resource tables and connection tables. The connection manager module 445 is responsible for creating the most optimal or efficient route available at any given time between two points, for example, one telecommunication resource 220 and another telecommunication resource 220. The connection manager module 445 also sets up the route, informing the application 410 that the route is ready. In addition, the connection manager module 445 may switch a route dynamically while the application 410 is executing and will tear down the route when the application 410 is finished using the route.

The connection manager module 410 allows the application 410 to couple to a telecommunication resource 220 that is allocated with another point in the telecommunication system 100. The other point may be, for example, another telecommunication resource 220 or a STE 235. Keeping the route connections within the connection manager module 445 and only informing the application 410 whether a route is available or not reduces the complexity of the application 410, because it reduces the number development paths that are necessary, as well as speeds the development of the applications 410.

Figure 5:
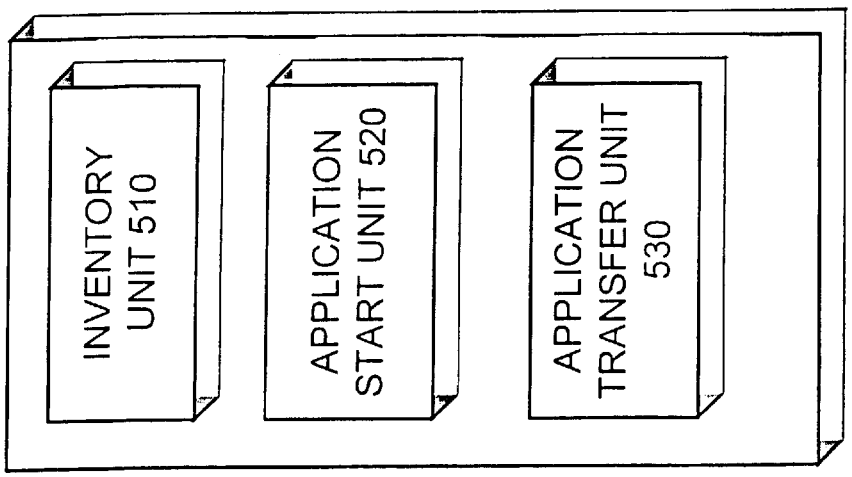
FIG. 5 is a block diagram illustrating one embodiment of a system manager module in accordance with the present invention.

FIG. 5 is a block diagram illustrating one embodiment of the system manager module 425 in accordance with the present invention. The system manager module 425 includes an inventory unit 510, an application start unit 520, and an application transfer unit 530.

The inventory unit 510 maintains an inventory list of every application 410 and every telecommunication resource 220 in the telecommunication system 100. To maintain the inventory list, each application 410 within the telecommunication system 100 is listed along with the node where that application is located. Further, each telecommunication resource 220 coupled within the telecommunication system 100 is listed along the node where that telecommunication resource 220 is located. In one embodiment, the inventory list may be maintained in a tabular format.

The application start unit 520 initializes applications 410 to begin executing within the telecommunication system 100. In particular, the application start unit 520 locates the node and the requested application in response to an event occurring within the telecommunication system 100. Once the requested application 410 has been located, the application start unit 520 determines whether the application 410 is already running. If the application is already running, it only needs an event to begin operation. Otherwise, an event will begin the process of executing the application 410.

If the application 410 needs to be executed, the application start unit 520 builds an application initialization message that inform the operating system 310 to begin executing (processing) the application 410. It is noted that the event may be telecommunication signal based event, for example, a signal indicating that a line coupled with some STE 235 has been seized.

The application transfer unit 530 handles requests for transferring telecommunication resources 220 between applications 410 or the modules of the telecommunication system kernel 320. By handling transfer requests, the application transfer unit 530 allows the telecommunication resource 220 to, for example, move a particular caller, for example, between different applications without requiring the caller to hang up and call a different number.

The application transfer unit 530 also helps the system manager module 425 maintain a proper load balancing distribution across the telecommunication system 100. In addition, the application transfer unit 530 re-routes applications across the telecommunications system 100 if a particular node fails, thereby minimizing impact on operation if a particular node fails.

Figure 6:
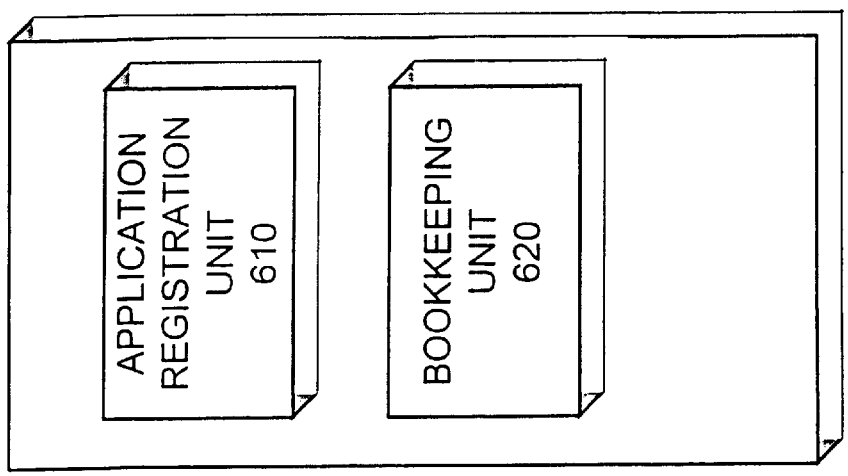
FIG. 6 is a block diagram illustrating one embodiment of a session manager module in accordance with the present invention.

FIG. 6 is a block diagram illustrating one embodiment of the session manager module 430 in accordance with the present invention. The session manager module 430 tracks each session of each application 410 as it is started by the system manager module 425 and maintains a list of all active sessions of applications 410 in the telecommunication system 100.

The session manager module 430 includes an application registration unit 610 and a bookkeeping unit 620. The session manager module 430 is responsible for insuring that each application session's telecommunication resources 220 are released back to the telecommunication system 100 when that session of the application 410 is finished, terminated or cleaned up because a session terminated prematurely. The session manager module 430 also keeps communication resources 220 from being locked away by applications 410 that are not coded correctly.

The application registration unit 610 registers each application 410 that is currently executing within the telecommunication system 100. Once the application 410 is registered with the application registration unit 610, it notifies the other modules 425, 435, 440, 445 that a new session has been created for the application 410. Similarly, the application registration unit 610 notifies the other modules 425, 435, 440, 445 when a session has been terminated for the application 410.

The bookkeeping unit 620 provides bookkeeping-type services for the telecommunication system 100. For example, the bookkeeping unit 620 may include a watchdog sub-unit, a traffic-log sub-unit, and an error sub-unit. The watchdog sub-unit monitors the operating system 310 to detect process malfunctions. When a malfunction is detected, the watchdog sub-unit checks the application registration unit 610 to determine if the malfunction was related to an executing application. If the malfunction was related to an executing application, the watchdog sub-unit issues a message to clean-up or terminate the application.

The traffic-log sub-unit performs, collects, and stores a detailed usage analysis of all nodes 110, 110', telecommunication resources 220, and executing applications 410 in the telecommunication system 100. The collected analysis information is used for monitoring system performance and evaluating system utilization, load sharing, and other performance related information.

The error log sub-unit collects and stores information on all errors that occur in the telecommunication service kernel 320. The error log sub-unit also collects and stores errors generated by applications that are executing in the telecommunication system 100. The error log sub-unit aids in maintaining a history record of problems within the telecommunication system 100 and aids in providing diagnostics assistance for the telecommunication system 100.

Figure 7:
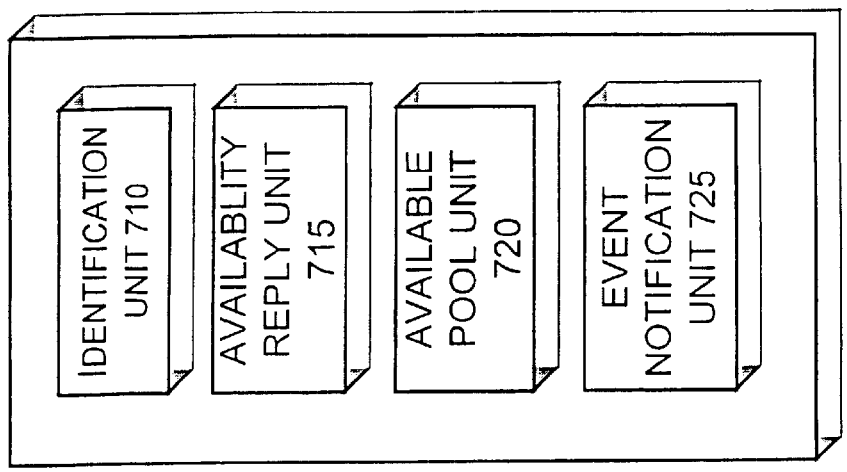
FIG. 7 is a block diagram illustrating one embodiment of a hardware manager module in accordance with the present invention.

FIG. 7 is a block diagram illustrating the hardware manager module 435 in accordance with the present invention. The hardware manager module 435 includes an identification unit 710, an availability reply unit 715, an available pool unit 720, and an event notification unit 725.

The identification unit 710 configures the hardware resources, including the telecommunication resources 220. Specifically, each telecommunication resource 220 is assigned a unique system identification reference. The system identification reference includes a node number for the physical hardware connection, a sequential identification number that identifies the actual telecommunication resource 220 itself, and a physical port number within a telecommunication service system 110, 110'. The system identification reference may be stored in the identification unit 710 in a tabular format.

It is noted that each telecommunication resource 220 from a given manufacturer or vendor is given a physical identification reference, for example, the sequential identification number, by that manufacturer. The sequential identification number allows the telecommunication system to identify the telecommunication resource 220 for internal interfacing or communication purposes.

Thus, the system identification reference allows for efficiently managing the telecommunication resources 220 in the telecommunication system 100 because other components of the telecommunication system 100 do not need to store this information. Moreover, as telecommunication resources 220 are added or removed from the telecommunication system, they can be immediately identified and then either made available or not made available by the telecommunication services kernel 320 for requesting applications 410.

The availability reply unit 715 provides an availability message to the resource manager module 440 that indicates whether there is a telecommunication resource 220 available for a requesting application 410. If a telecommunication resource 220 is available, the availability reply unit 715 can assign that telecommunication resource 220 to the resource manager module 440 for the application 410.

The available pool unit 720 provides an information database as to a pool or bank of telecommunication resources 220 that are available for use within the telecommunication system 100. Available telecommunication resources 220 includes those telecommunication resources 220 that are functional and are not currently in use by an application, a STE 235, or another module of the telecommunication service kernel 320. Thus, by maintaining a pool of telecommunication resource 220 availability, and allowing for allocation of these resources 220 to applications 410 on an as needed bases, the present invention increases the overall utilization and efficiency of the resources 220 within the telecommunication system 100.

The availability reply unit 715 provides the availability message based on telecommunication resources 220 that are available in the available pool unit 720. It is noted that the availability reply unit 715 may be assembled in tabular format. The event notification unit 725 detects an event signal that is related to an event in the telecommunication system 100 from the telecommunication resources 220. The event notification unit 725 also sends a message to the system manager module 425 notifying it of the event. The event may include a conventional telecommunication event, for example, a telephone ring signal, a telecommunication line seized signal, or other functional telecommunication-related event.

Figure 8:
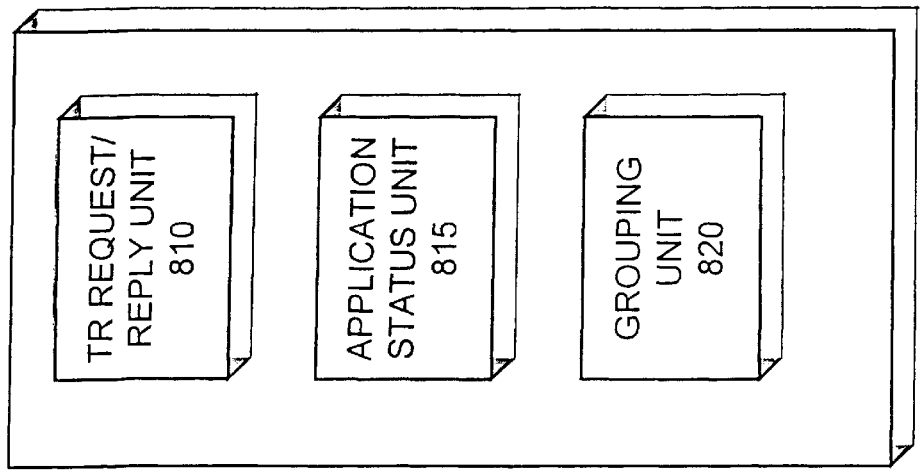
FIG. 8 is a block diagram illustrating one embodiment of a resource manager module in accordance with the present invention.

FIG. 8 is a block diagram illustrating the resource manager module 440 in accordance with the present invention. The resource manager module 440 includes a telecommunication resource request/reply unit 810, an application status unit 815, and a grouping unit 820. The grouping unit 820 groups telecommunication resources 220 for a particular application 410. The grouping information is kept in the grouping unit 820 in tabular format.

The grouping unit 820 allows a system administrator to segment the system and telecommunication resources 220 and allocate groups of the telecommunication resources 220 between the different applications 410. For example, one group of telecommunication resources 220, e.g., telephony resources, may be connected to a number of STE 235 telephone sets. The system administrator may decide allow access only to a particular application in the system 100 from all of these telephone sets, from a sub-set of these telephone sets, or from a single telephone set, while allowing all of the telephone sets to access other applications within the product.

The telecommunication resource request/reply unit 810 submits a request message to the hardware manager module 435 for a telecommunication resource 220 in response to being notified of an executing application's 410 telecommunication resource 220 needs. In addition, the telecommunication request/reply unit 810 submits a reply message to the hardware manager module 435 once the session manager module 430 informs the resource manager module 440 that the application 410 has completed execution so that control of the telecommunication resource 220 can be returned to the hardware manager module 435.

The application status unit 815 maintains information on each application 410 that is executing and the telecommunication resources 220 that are currently in use with that application 410. Further, the application status unit 815 allows the resource manager module 440 to maintain ownership over each telecommunication resource 220 in use with that application 410 once it is assigned the telecommunication resources 220 by the hardware manager module 435. Once the application 410 completes use of the telecommunication resource 220, the resource manager module 435 removes the telecommunication resource 220 from application status unit 815 and returns that telecommunication resource 220 to the hardware manager module 435, which can re-allocate that resource 220.

Figure 9:
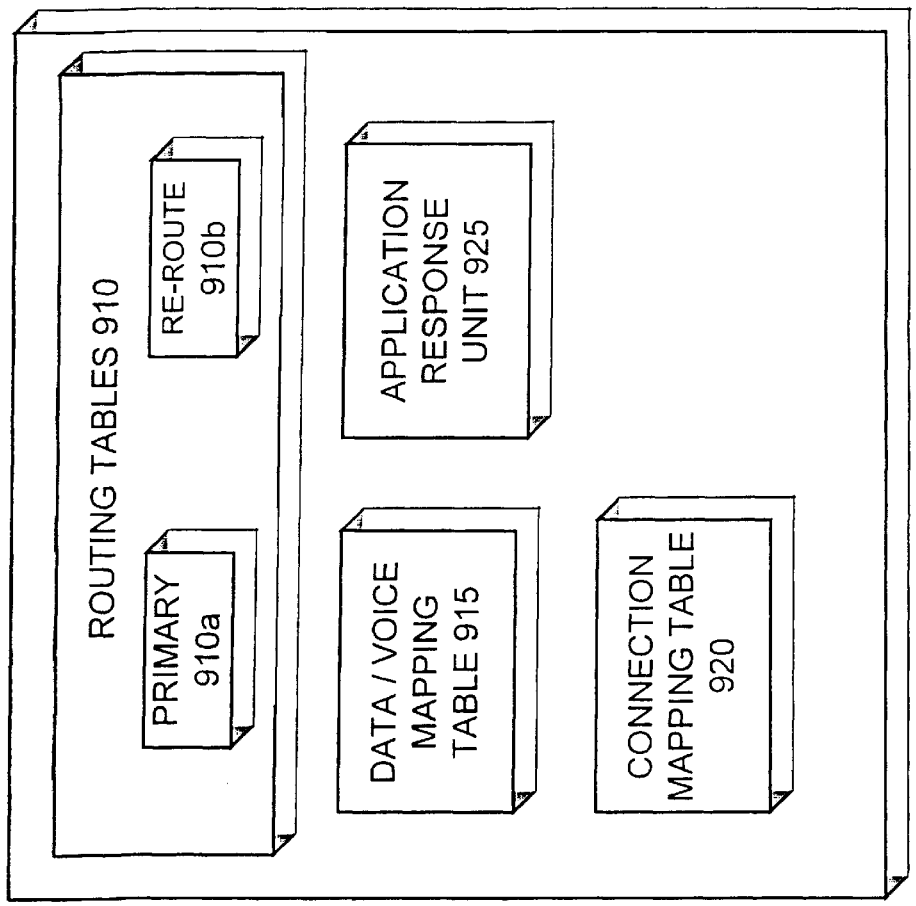
FIG. 9 is a block diagram illustrating one embodiment of a connection manager module in accordance with the present invention.

FIG. 9 is a block diagram illustrating one embodiment of the connection manager module 445 in accordance with the present invention. The connection manager module 445 includes a set of routing tables 910, a data/voice path mapping table, a connection mapping table 920, and an application response unit 925. The set of routing tables 910 include a primary route table 910a and a re-route table 910b. Additional routing-tables, e.g., to support a particular application 410, may be included within the set of routing tables 910.

The connection mapping table 920 includes a map of all data and/or voice routes that are currently in use by the telecommunication system 100 between any two given points within the telecommunication system 100. A point may be, for example, a telecommunication resource, a STE connection, a PSTN connection, or other telecommunication device, product, or system connection point. Moreover, a point-to-point connection may be, for example, one telecommunication resource to another telecommunication resource, a telecommunication resource to a STE connection, or other connection between two telecommunication products, devices, or systems or the like.

The data/voice path mapping table 915 identifies a set of all possible data and/or voice route mappings that can be configured between one point and one or more other points within the constraints of the telecommunication system 100. The application response unit 925 notifies an application 410 that a route has been established once the connection manager module 445 establishes that route.

Generally, connection manager module 445 receives a request from the application 410 asking to provide a route or path to couple one point with one or more other points. For example, the application may request from the connection manager module 445 a particular source point to destination point connection route. The connection manager module 445 reviews its set of routing tables 910, and in particular the primary routing table 910a, to find the current routing between the points and the possible routing between the points to determine if a route is possible. If multiple routes are possible, the primary table 910a of the connection manager module 445 also helps determine what is the most cost efficient route.

The connection manager 445 may need to re-route existing data and/or voice paths for other applications to accommodate a new telecommunication resource 220 or application 410 request. Specifically, the re-routing table 910b of the connection manager module 440 handles re-routing automatically without interfering with any other active application 410. Moreover, the connection manager module 445 uses the re-route table 910b to perform re-routing of routes or paths dynamically while the application 410 continues to execute.

Once a data and/or voice route has been established by the connection manager module 445, the route is entered into the connection mapping table 920. The application 410 is notified through the application response unit 925 that a route has been established and the application 410 may continue processing. If a route cannot be established, the application 410 is accordingly notified.

The application 410 proceeds by taking whatever recovery procedures it needs to take to complete processing. The recovery procedures include, for example, to wait until telecommunication resources 220 become available or notify the user that telecommunication resources 220 are not available at this time.

Once the application 410 is finished with the route, the connection manager module 445 removes the route from the connection mapping table 920. The now unused routing resources may be returned to the routing resource pool to be used for later mappings as required by the applications 410. It is noted that the routing resource pool is a pool of possible routes in the telecommunication system 100 and this pool may be maintained by the primary table 910a.

By keeping the routing information and responsibilities within the connection manager module 445, the present invention beneficially reduces the application level coding for a particular application in the telecommunication system 100. Further, the present invention advantageously simplifies the design, coding, testing, and integration phases for an application in the telecommunication system 100 because all possible paths do not have to be specifically coded in the application to provide the routes.

Figure 10:
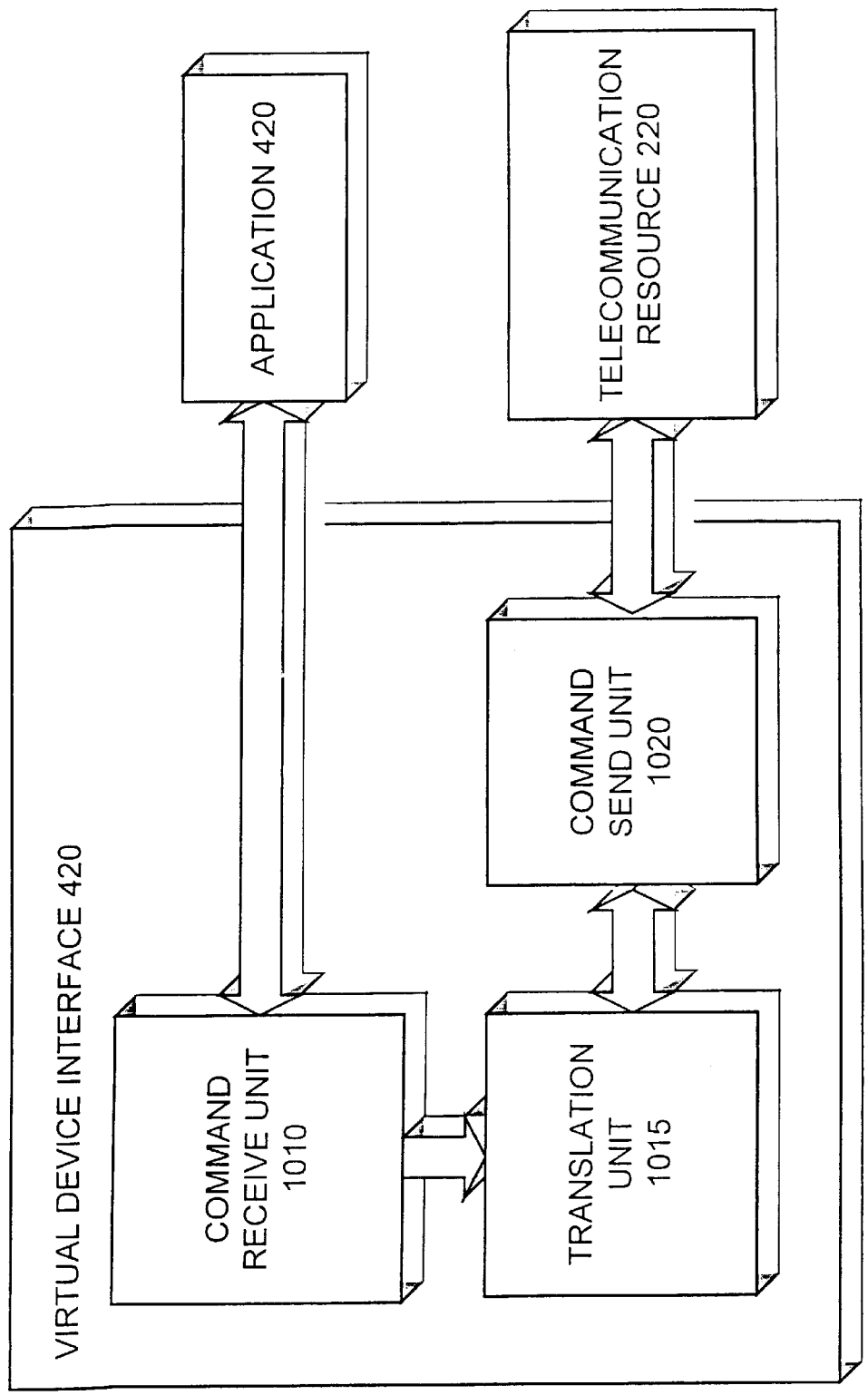
FIG. 10 is a block diagram illustrating one embodiment of a virtual device interface in accordance with the present invention.

FIG. 10 is a block diagram illustrating one embodiment of the virtual device interface 420 in accordance with the present invention. Generally, as described above, the virtual device interface 420 provides an interface between an application 410 and the telecommunication services kernel 320. The virtual device interface 420 translates general resource-related commands that an application 410 understands and actual, specific resource-related commands that a vendor specific, or standards-specific, telecommunication resource 220 understands. Thus, each application 410 may be written to one common interface rather than to multiple, specific, or particular interfaces associated with each telecommunication resource 220.

The virtual device interface 420 includes a command receiver unit 1010, a translation unit 1015, and a command send unit 1020. The command receive unit 1010 is coupled to an application 410 and the translation unit 1015. The translation unit 1015 is coupled to the command send unit 1020. The command send unit 1020 is coupled to a telecommunication resource 220 that is allocated to the application 410.

The command receiver unit 1010 receives virtual commands from an application 410. A virtual command is a general telecommunications instruction, for example, "take the phone off hook", "hang up the phone", "dial the following number", or other general telecommunication related or type instruction. The translation unit 1015 is a library that includes all the virtual commands and actual, resource specific, commands for each telecommunication resource 220 that is in, or could be added to, the telecommunication system 100. The actual, resource specific, commands may be defined by a designer or manufacturer of that telecommunications resource 220 or by a standards board.

The translation unit 1015 maps each virtual command to an actual command that can be understood by the specific or particular telecommunication resource 220 allocated to an application. Thus, the translation unit 1015 can translate between virtual commands that can be understood by the application 410 and the resource-specific commands that can be understood by a telecommunication resource 220. It is noted that resource-specific commands may be set or determined by, for example, the telecommunication resource 220 manufacturer or designer or by a standards organization.

The command send unit 1020 issues the resource specific command from the translation unit 1015 to the allocated telecommunication resource 220. It is noted that the command send unit 1020 can receive resource specific instructions from a telecommunication resource 220. These instructions can be passed to the translation unit 1015 which translates the resource specific instruction into the virtual commands. The command receive unit 1010 issues the virtual commands to the application 410.

Generally, the command receiver unit 1010 of the virtual device interface 420 receives the virtual command from the application 410. The virtual command is then translated into the proper telecommunication resource 220 resource specific command by the translation unit 1015, based on the telecommunication resources 220 that are allocated to the application 410. The command send unit 1020 then issues the resource specific command to the allocated telecommunication resource 220 for execution. Similarly, as described above, the virtual device interface can receive resource specific commands from any telecommunication resource 220 and translate them into virtual commands for any application 410.

The virtual device interface 420 advantageously allows application developers to write to and interface with a single virtual device that supports all of the functionality of all possible telecommunication resources using a standard programming interface. Thus, the present invention beneficially reduces the application development complexity of the application because it is no longer necessary to design, code, test, and integrate each application with each specific or particular telecommunication resource. Moreover because applications do not need to be dedicated to any particular telecommunication resource, the virtual device interface of the present invention advantageously allows for adding or removing telecommunication resources in the system with minimal disruption.

Figure 11:
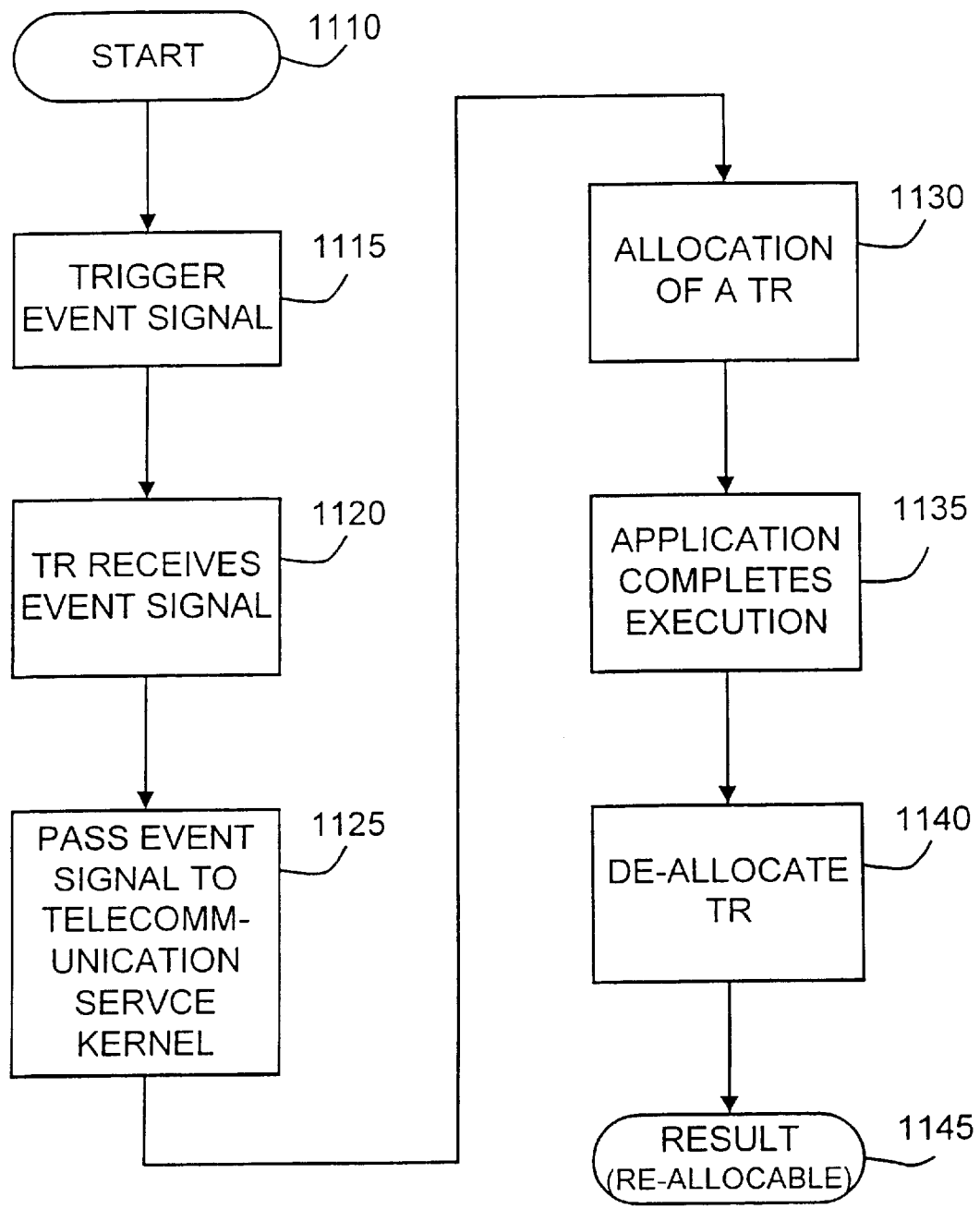
FIG. 11 is a flow diagram illustrating one embodiment of a general process for allocating a telecommunication resource to an application in a telecommunication system in accordance with the present invention.

Referring now to operation of the telecommunication system 100, FIG. 11 is a flow diagram illustrating one embodiment of a general process for allocating or allotting a telecommunication resource 220 to an application 410 that requests a telecommunication resource in a telecommunication system 100 in accordance with the present invention. When the process starts 1110, an event at, for example, the STE 235 or the PSTN 240, triggers 1115 an event signal. The event is an event such as one described above. The event signal is received 1120 by the telecommunication resource 220 that is coupled to the particular STE 235 or PSTN 240 that triggers 1115 the event signal.

The receiving telecommunication resource 220 passes the event signal to the telecommunication service kernel 320 in the memory 210 through the central processing unit 205. The event signal causes an application 410 associated with that event signal to begin executing (processing). The application 410 issues a request signal to request a telecommunication resource 220 from telecommunication service kernel 320. The telecommunication service kernel 320 appropriately allocates 1130 to the application 410 a telecommunication resource 220 from its pool of available telecommunication resources.

Once, the application 410 completes 1135 execution, the allocated telecommunication resource 220 is de-allocated from the application 410. The result 1145 is that the telecommunication resource 220 is returned to the pool of available telecommunication resources and, thus, is re-allocable to an application 410.

Figure 12:
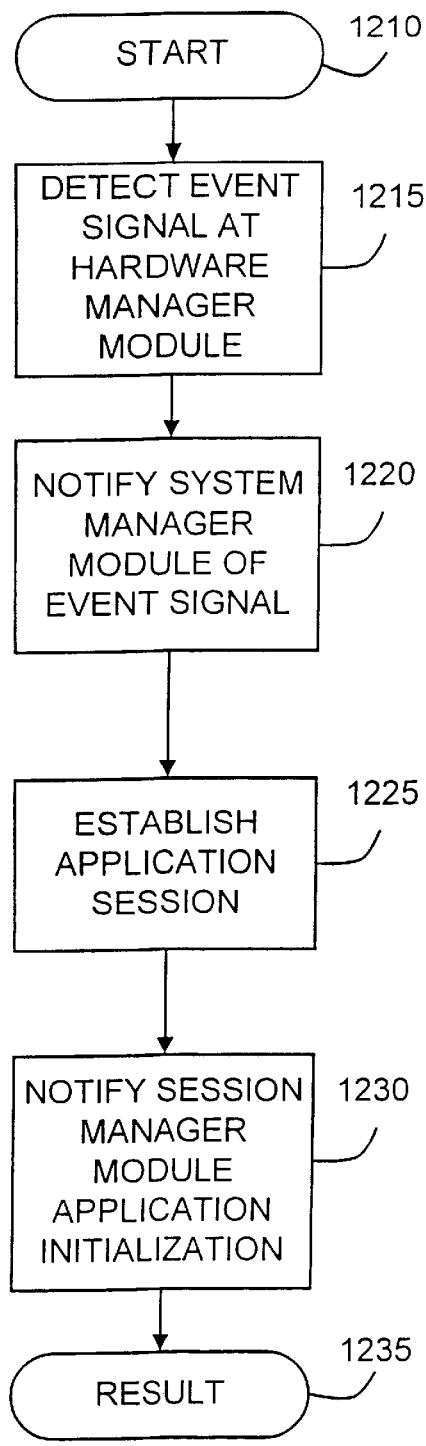
FIG. 12 is a flow diagram illustrating one embodiment of a process for executing an application in a telecommunication system in accordance with the present invention.

FIG. 12 is a flow diagram illustrating one embodiment of a process for executing the application 410 triggered by the event signal in the telecommunication system 100 in accordance with the present invention. When the process starts 1210, the event signal is received by the telecommunication service kernel 320, as described above. Specifically, the hardware manager module 435 detects 1215 the event signal when received by the telecommunication service kernel 320. The event notification unit 725 in the hardware manager module 435 sends a signal notifying 1220 the system manager module 425 that the event signal was received in the telecommunication system 100.

The system manager module 425 receives the notification signal from the hardware manager module 435 and determines that a session must be established 1225 for the application 410 that is associated with the event signal. It is noted that the application 410 assigned to that particular resource by the system administrator through a configuration file or other type of initialization is registered in the application registration unit 610 of the session manager module 430.

The system manager module 425 determines that an application needs to be executed. Specifically, the system manager module 425 checks its inventory unit 510 to locate the application 410 in the telecommunication system 100. Once located, the application start unit 520 initializes the application 410 to begin executing and sends a signal to the session manager module 430 notifying 1230 it that the application 410 has been initialized. The result 1235 is that the application 410 begins execution and is ready to request use of the telecommunication resources 220. The system manager module 425 then releases the application session to the session manager module 430 for the duration of the time that the application 410 executes.

Figure 13:
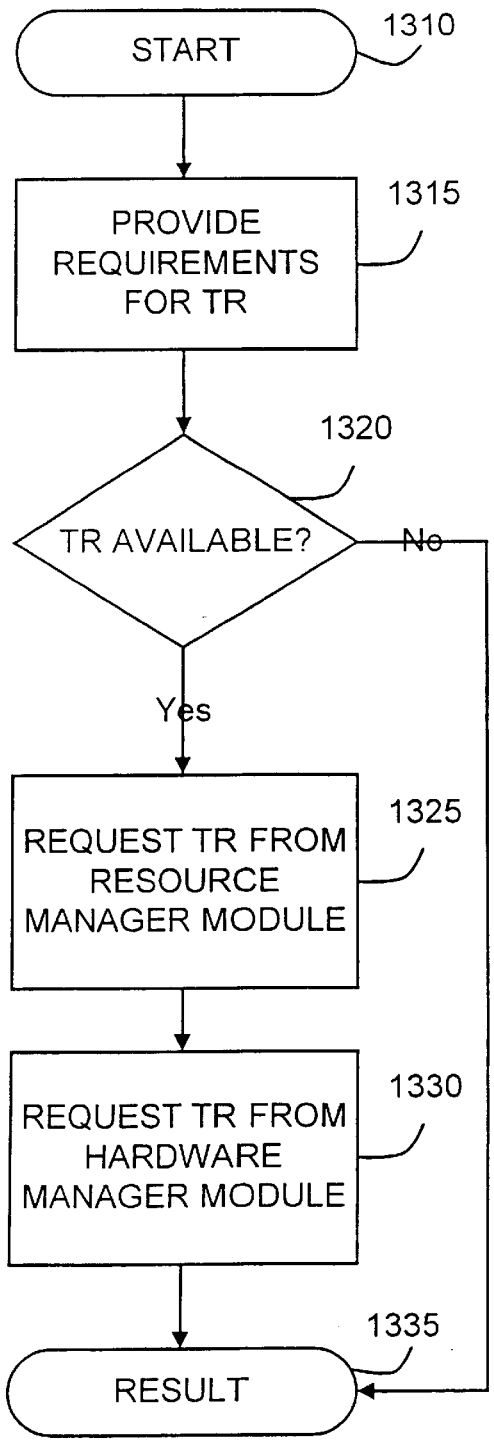
FIG. 13 is a flow diagram illustrating one embodiment of a process for preparing allocation of a telecommunication resource to an application in a telecommunication system in accordance with the present invention.

FIG. 13 is a flow diagram illustrating one embodiment of a process for preparing allocation of the telecommunication resource 220 to the application 410 within the telecommunication system 100 in accordance with the present invention. The process starts 1310 with the application 410 initialized and executing within the telecommunication system 100.

The application 410 issues a request signal and provides 1315 its requirements for a telecommunication resource 220 to the resource manager module 440. The telecommunication request unit 810 of the resource manager module 440 generates a resource signal that queries the hardware manager module 435 to determine 1320 whether a telecommunication resource 220 is available for allocation that meets the necessary requirements provided by the application 410. The available pool unit 720 of the hardware manager module 435 checks whether there is an appropriate telecommunication resources 220 available that satisfies the requirements provided by the application 410.

The availability reply unit 715 generates an availability status signal that notifies the resource manager module 440 of whether there are available appropriate telecommunication resources 220. If there are no available appropriate telecommunication resources 220, the result 1335 is that the resource manager module 440 provides a reply signal that informs the application 410 that a telecommunication resource 220 is not currently available. In response, the application 410 shuts down or goes into a wait mode until a telecommunication resource or resources 220 are available If there are appropriate telecommunication resources 220 available, the telecommunication request/reply unit 810 of the resource manager module 440 issues a signal that requests 1330 the appropriate telecommunication resource 220 from the hardware manager module 435. The result 1335 is the availability reply unit 715 of the hardware manager module 435 issues an allocation signal that allocates to the resource manager module 440 the appropriate telecommunication resource 220. The resource manager module 440 then sends its reply signal to inform the application 410 that the telecommunication resources 220 requested are now available and allocable to the application 410.

The available pool unit 720 identifies the allocated telecommunication resource 220 through the identification unit 710 of the hardware manager module 435, and marks that telecommunication resource 220 as now unavailable, until it is returned back to the available pool unit 720 Further, once the resource manager module 440 is allocated the telecommunication resource 220, the resource manager module 440 assigns the telecommunication resource 220 to the application 410. The telecommunication resource 220 and the application are maintained, and controlled, through the application status unit 815 of the resource manager module 440.

Figure 14:
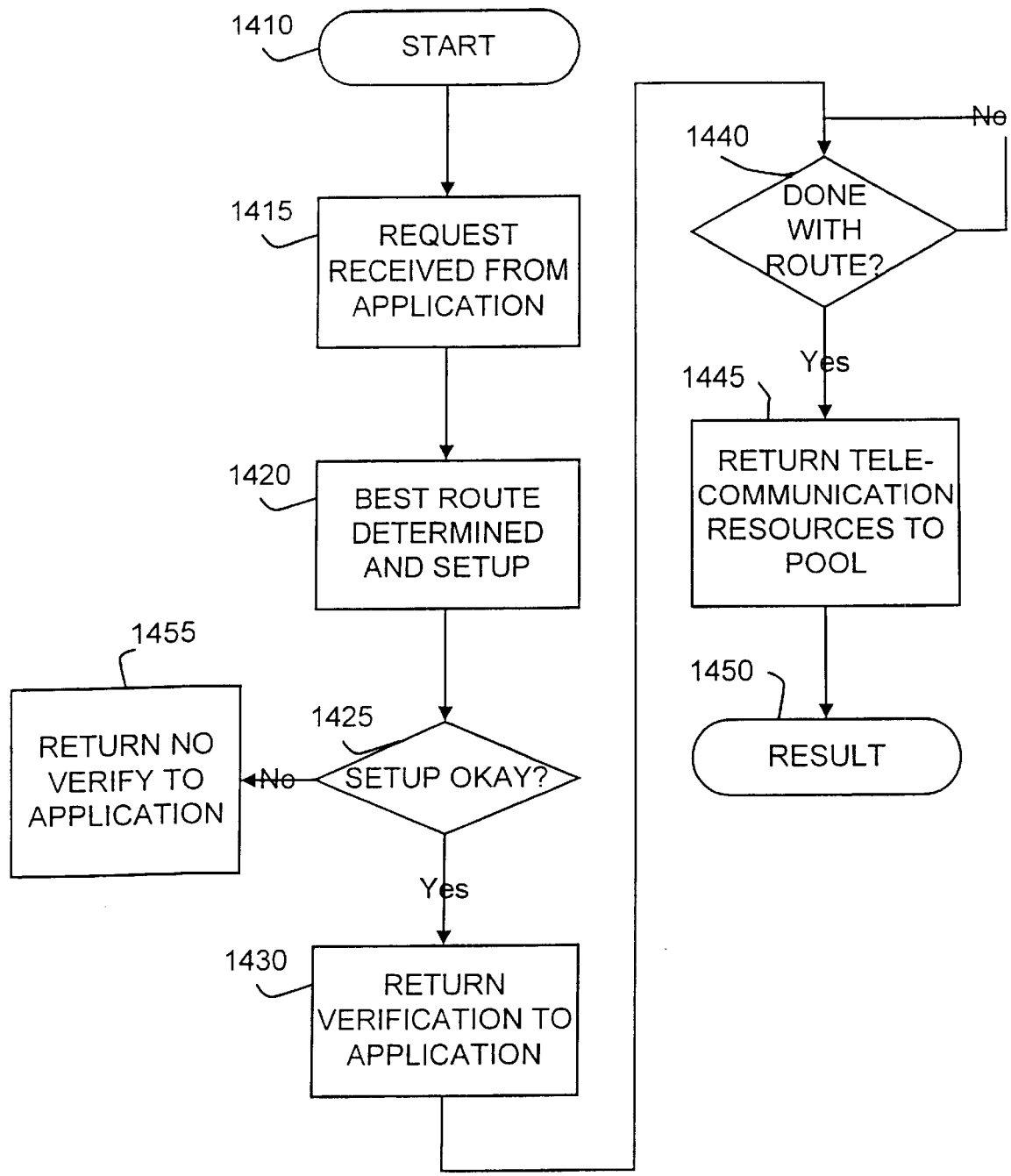
FIG. 14 is a flow diagram illustrating one embodiment of a process for establishing a connection between a telecommunication resource allocated to an application and another point in accordance with the present invention.

FIG. 14 is a flow diagram illustrating one embodiment of a process for establishing a connection between the telecommunication resource 220 allocated to the application 410 and another point in the telecommunication system 100 in accordance with the present invention. When the process starts 1410, the connection manager module 445 receives 1415 a request route signal from the application 410 requesting a route to connect the allocated telecommunication resource 220 and another point in the telecommunication system 100. The connection manager module 445 consults the data/voice mapping table 915 to identify all the possible routes for coupling the two points.

The connection manager module 445 then consults its routing tables 910 to determine 1420 the route that is best to establish this connection. For example, the connection manager module 445 consults the primary routing table 910*a* to find which of the identified routes are available current and possible routings, as well as the most efficient route. If particular routes are unavailable, the connection manager module may consult the re-route table 910*b* for alternate routing and may have to re-route already existing application routing to complete the new routing.

Once the route is determined, it is also setup, that is, connected from end-to-end, or point-to-point, based on the routing determined by the connection manager module 445. The process then determines 1425 whether the setup was successful. If the setup was successful, the route is added to the connection mapping table 920 of the connection manager module 445. The application response unit 925 returns a route verification signal to the application 410 to verify that the route is setup and established.

The connection manager module 445 continues to check the application 410 to determine 1540 whether it is done with the route. Once the application 410 is done with the route, the connection manger module 445 returns 1445 the allocated telecommunication resource 220 to the pool of telecommunication resources. The result 1450 is that the connection manager module 445 is able to establish proper routing for the application 410 within the telecommunication system 100. Thus, the present invention beneficially saves application development resources because every path between applications and telecommunication resources does not need to be individually designed, coded, tested, and integrated.

If the process determines 1425 that the setup was not successful, the application response unit 925 returns 1455 an unable to verify signal to the application 410 that indicates that a route was not setup and established. The result 1450 is that the application 410 performs a recovery function, for example, wait for a route to be established or terminate itself.

FIG. 15 is a flow diagram illustrating one embodiment of a process for communication between the application 410 and the allocated telecommunication resource 220 through the virtual device interface 420 in accordance with the present invention. At the start 1510 of the process, the virtual device interface 420 command receive unit 1010 receives 1515 a virtual command from an application 410. Virtual commands are described above.

The command receive unit 1010 passes, or forwards, the virtual command to the translation unit 1015. The translation unit 1010 uses its set of translation tables to translate 1520 the virtual command into the resource-specific command based upon the telecommunication resource type allocated to the application. The translation unit 1015 then passes, or forwards, the translated command to the command send unit 1020. The command send unit 1020 issues 1525 the command to the allocated telecommunication resource 220.

The result 1530 is that the telecommunication resource 220 receives resource-specific commands while the application 410 provides general virtual commands. Thus, the present invention advantageously allows for applications to be designed, coded, tested, and integrated with a single interface rather than multiple interfaces.

FIG. 16 is a flow diagram illustrating one embodiment of a process for de-coupling and returning the assigned telecommunication resource 220 from the application 410 back to the pool of telecommunication resources in the telecommunication system 100 in accordance with the present invention. After the start 1610 of this process, the application 410 issues a completion signal that notifies 1615 the session manager module 430 that execution is completed. The application 410 shuts-down 1620, i.e., stops executing, and the registration unit 610 of the session manager module 430 removes the application 410 from its list of currently executing applications.

The session manager module 430 provides a status signal that notifies 1625 the resource manager module 440 that the application 410 has completed execution. The telecommunication resource request/reply unit 810 of the resource manager module 440 sends a reply signal back acknowledging this so that the telecommunication resource 220 can be de-coupled from the application 410.

The telecommunication resource request/reply unit 810 removes the application and the telecommunication resource 220 information from the application status unit 815. The resource manager module 440 relinquishes control of the telecommunication resource 220 and returns 1630 the telecommunication resource 220 back to the hardware manager module 435.

The result 1635 of this process is the hardware manager module 435 now places the telecommunication resource 220 back into the pool, or bank, of available telecommunication resources. Thus, the telecommunication resource 220 can now be re-allocated to the next application 410 that requests a telecommunication resource 220.

The telecommunication (including computer telephony) system and method of the present invention advantageously allows for allocating a telecommunication resource to an application in a dynamic manner. By keeping a single pool or multiple system administrator defined pools of telecommunication resources, rather than dedicating each particular telecommunication resource to particular applications, the present invention beneficially increases overall system utilization and efficiency.

Also, because the telecommunication resources are under the control of the service system, rather than a specific application, the present invention beneficially can balance resource allotment, as well as add and remove resources with minimal disruption. In addition, the present invention allows for telecommunication resources to be dynamically added or removed from the telecommunication system without having to re-start and re-initialize because applications are not dedicated to any particular telecommunication resource.

Further, the present invention optimizes use of limited system resources because more applications can be introduced into the telecommunication system without having to arrange for additional dedicated telecommunication resources. The present invention also beneficially reduces development resources because applications can be written to a single telecommunication resource interface, rather than multiple, resource-specific interfaces. The present invention also advantageously increases system flexibility because it is not necessary to re-write applications when new telecommunication resources are added or deleted from the telecommunication system.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a telecommunication system, a sub-system for communications between an application from a plurality of applications and a telecommunication resource from a plurality of telecommunication resources, comprising:

an interface configured to receive a virtual command from the application, translate the virtual command to a resource specific command, and transmit the resource specific command to the telecommunication resource, and configured to receive the resource specific command from the telecommunication resource, translate the resource specific command to the virtual command, and transmit the virtual command to the application; and a hardware manager module coupled to the plurality of telecommunication resources configured to determine the availability of the telecommunication resource wherein the hardware manager module initially determines the availability of each telecommunication resource from the plurality of telecommunication resources following at least one from a group consisting of a powering-up and an initialization.

2. The sub-system of claim 1, wherein the hardware manager module further comprises an identification unit configured to identify the telecommunication resource.

3. The sub-system of claim 1, wherein the hardware manager module identifies the telecommunication resource coupled to the telecommunication system after at least one from a group consisting of the powering-up and the initialization.

4. The sub-system of claim 1, wherein the hardware manager module further comprises an available pool unit configured to determine whether the telecommunication resource of the plurality of telecommunication resources is functional.

5. The sub-system of claim 4, wherein the hardware manager module further determines whether the telecommunication resource is currently in use.

6. The sub-system of claim 1, wherein the hardware manager module notifies a resource manager module of the availability of the telecommunication resource.

7. In a telecommunication system, means for communicating between an application from a plurality of applications and a telecommunication resource from a plurality of telecommunication resources, comprising:

a means for receiving a virtual command from the application, further comprising,
   a means for translating the virtual command to a resource specific command,
   a means for transmitting the resource specific command to the telecommunication resource,
   a means for receiving the resource specific command from the telecommunication resource,
   a means for translating the resource specific command to the virtual command, and
   a means for transmitting the virtual command to the application; and a means for determining the availability of the telecommunication resource.

8. The means of claim 7, wherein the means for determining the availability of the telecommunication resource further comprises a means for identifying the telecommunication resource.

9. The means of claim 7, wherein the means for determining the availability of the telecommunication resources further comprises a means for identifying the telecommunication resource coupled to the telecommunication system following at least one from a group consisting of the powering-up and the initialization.

10. The means of claim 7, wherein means for determining the availability of the telecommunications resource further comprises a means for determining whether the telecommunication resource is functional.

11. The means of claim 7, wherein the means for determining the availability of the telecommunications resource further comprises a means for determining whether the telecommunication resource is currently in use.

12. The means of claim 7, wherein the means for determining the availability of the telecommunication resource further comprises a means for notifying a means for requesting the telecommunication resource of the availability of the telecommunication resource.

13. The means of claim 7, wherein the means for receiving the virtual command from the application comprises an interface.

14. The means of claim 7, wherein the means for determining the availability of the telecommunication resource comprises a hardware manager module.

15. The means claim 12, wherein the means for requesting the telecommunication resource comprises a resource manager.

16. In a telecommunication system, a method for communicating between an application from a plurality of applications and a telecommunication resource from a plurality of telecommunication resources, comprising:

receiving a virtual command from the application, further comprising,
   translating the virtual command to a resource specific command,
   transmitting the resource specific command to the telecommunication resource,
   receiving the resource specific command from the telecommunication resource,
   translating the resource specific command to the virtual command, and
   transmitting the virtual command to the application; and determining the availability of the telecommunication resource.

17. The method of claim 16, wherein determining the availability of the telecommunication resource further comprises identifying the telecommunication resource.

18. The method of claim 16, wherein determining the availability of the telecommunication resource further comprises identifying the telecommunication resource coupled to the telecommunication system following at least one from a group consisting of the powering-up and the initialization.

19. The method of claim 16, wherein determining the availability of the telecommunication resource further comprises determining whether the telecommunication resource is functional.

20. The method of claim 19, wherein determining the availability of the telecommunication resource further comprises determining whether the telecommunication resource is currently in use.

21. The method of claim 16, wherein determining the availability of the telecommunication resource further comprises notifying a resource manager module of the availability of the telecommunication resource.

22. A virtual device interface in a telecommunications system, comprising:
- a hardware manager module coupled to a plurality of telecommunications resources configured to update a pool of available telecommunication resources without re-initialization;
- a resource manager module coupled to the hardware manager module configured to allocate an available telecommunication resource from a plurality of applications to a requesting application; and
- a translation unit configured to translate a virtual command from the application to a resource specific command for the telecommunication resource, and configured to translate the resource specific command from the telecommunication resource to the virtual command for the application.

23. The virtual device interface of claim 22, wherein the hardware manager assigns an identification reference to each telecommunication resource.

24. The virtual device interface of claim 23 wherein the identification reference is at least partially based on at least one from a group consisting of a manufacturer and a vendor of the telecommunication resource.

25. The virtual device interface of claim 23, wherein the resource specific commands are based on at least one from a group consisting of a manufacturer and a vendor of the telecommunication resource.

* * * * *